US010658924B2

United States Patent
Chizuwa et al.

(10) Patent No.: US 10,658,924 B2
(45) Date of Patent: May 19, 2020

(54) POWER CONVERTER THAT CONVERTS INPUT AC POWER INTO DC POWER AND POWER CONVERSION METHOD OF POWER CONVERTER THAT CONVERTS INPUT AC POWER INTO DC POWER

(71) Applicant: Panasonic Intellectual Property Management Co., Ltd., Osaka (JP)

(72) Inventors: Shuhei Chizuwa, Tokyo (JP); Isao Isogai, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/256,600

(22) Filed: Jan. 24, 2019

(65) Prior Publication Data
US 2019/0229611 A1    Jul. 25, 2019

(30) Foreign Application Priority Data
Jan. 25, 2018  (JP) .................................. 2018-010541

(51) Int. Cl.
| | |
|---|---|
| *H02M 1/32* | (2007.01) |
| *H02M 1/42* | (2007.01) |
| *H02H 7/125* | (2006.01) |
| *H02M 7/06* | (2006.01) |
| *H02M 1/00* | (2006.01) |

(52) U.S. Cl.
CPC ........ *H02M 1/4208* (2013.01); *H02H 7/1252* (2013.01); *H02M 1/32* (2013.01); *H02M 7/06* (2013.01); *H02M 2001/0022* (2013.01)

(58) Field of Classification Search
None
See application file for complete search history.

(56) References Cited

U.S. PATENT DOCUMENTS

| | | | | |
|---|---|---|---|---|
| 2005/0269999 | A1* | 12/2005 | Liu ........................ | H02M 1/32 323/222 |
| 2007/0124615 | A1* | 5/2007 | Orr ........................ | G06F 1/189 713/300 |
| 2008/0074909 | A1* | 3/2008 | Mehta ................... | H02H 7/1213 363/52 |
| 2009/0152950 | A1* | 6/2009 | Zhang ................... | H02H 7/1213 307/43 |
| 2010/0244704 | A1* | 9/2010 | Takaki ................. | H05B 33/0896 315/127 |
| 2011/0109281 | A1* | 5/2011 | Yabuzaki .............. | G05F 1/70 323/210 |
| 2011/0122662 | A1* | 5/2011 | Li .......................... | H02M 1/32 363/49 |

FOREIGN PATENT DOCUMENTS

JP    2012-100382 A    5/2012

* cited by examiner

*Primary Examiner* — Jeffrey A Gblende
(74) *Attorney, Agent, or Firm* — Seed IP Law Group LLP

(57) ABSTRACT

A power converter includes an input voltage detection section, a power factor correction (PFC) section, a DC-DC conversion section, and a control section that stops power conversion operation in a case where an input voltage value is greater than or equal to a predetermined value. The control section resumes power conversion operation such that a second input current value lower than a first input current value corresponding to the input voltage value is input into the PFC section after stopping the power conversion operation.

14 Claims, 5 Drawing Sheets

POWER CONVERTER THAT CONVERTS INPUT AC POWER INTO DC POWER AND POWER CONVERSION METHOD OF POWER CONVERTER THAT CONVERTS INPUT AC POWER INTO DC POWER

TECHNICAL FIELD

The present disclosure relates to a power converter and a power conversion method.

BACKGROUND ART

A rechargeable battery such as an onboard battery installed in a green vehicle such as an electric vehicle receives input of electric power from an external AC supply through a charger (power converter). At this time, the voltage value input into the charger may vary depending on the external AC supply. To deal with the input voltage values that vary depending on the external AC supply, gain is adjusted for output in a power factor correction (PFC) circuit installed in the charger.

Specifically, in the PFC circuit, gain is adjusted by receiving input of current values respectively corresponding to the multiple input voltage values. When an input voltage value of an external AC supply is read by a control apparatus, for example, an input current value of the PFC circuit is set according to the input voltage value. Since gain is adjusted in this manner in the PFC circuit, the charger can provide a desired output even with different input voltage values.

In a known technique of such a charger, when an input voltage value of an external AC supply is an excess value that exceeds an assumed range, charging, that is, power conversion operation by a charger is stopped, and then power conversion operation by the charger is resumed.

For example, in a conventional technique, when trouble such as being affected by a lightening surge or the like occurs during charging, power conversion operation by a charger is stopped, and when the trouble is resolved, power conversion operation by the charger is resumed.

CITATION LIST

Patent Literature

PTL 1
Japanese Patent Application Laid-Open No. 2012-100382

SUMMARY OF INVENTION

Technical Problem

However, there is some inductance and resistance in a connection part between an external AC supply and a charger. Hence, when the value of resistance on the external AC supply side is excessively large, the input voltage value of the charger may drop more drastically than the assumed amount. In this case, after an input current value is set, when operation of a PFC circuit is started, the voltage value input into the PFC circuit drops excessively due to the drop of the voltage value, and the input voltage value changes to a substantially different value.

As a result, the input current value may be switched to an input current value corresponding to a different input voltage value in the middle of charging. Then, the increase in the amount of current fluctuation within a short time period may cause the output voltage value of the PFC circuit to exceed a desired value, whereby the PFC circuit may be controlled to stop operation.

When operation of the PFC circuit is stopped, the input current of the PFC circuit is interrupted and drops to 0 or a minute value. Since the amount of current fluctuation increases within a short time period, the inductance on the external AC supply side causes a voltage surge. When the amount of inductance on the external AC supply side is excessively large, the voltage surge becomes severe, the input voltage rises to an excess value, and the charger stops.

In the conventional technique, since the same external AC supply is still connected to the charger, similar voltage surges occur even when power conversion operation is resumed after stopping the charger. As a result, stoppage of the charger and resumption of power conversion operation are repeated endlessly. This causes insufficient charging of the rechargeable battery, and may also lead to reduction of life of internal components such as a capacitor installed in the charger, due to repeated charging and discharging by the internal component.

Objects of the present disclosure are to suppress insufficient charging of a rechargeable battery during charging, and to suppress reduction of life of an installed internal component.

Solution to Problem

A power converter according to the present disclosure is a power converter that converts input AC power into DC power, the power converter including:

an input voltage detection section that detects an input voltage value of the AC power;

a power factor correction (PFC) section, a current value to be input into the PFC section being variable depending on the input voltage value;

a DC-DC conversion section that is provided subsequent to the PFC section; and a control section that stops power conversion operation in a case where the input voltage value is greater than or equal to a predetermined value, in which the control section resumes the power conversion operation such that a second input current value lower than a first input current value corresponding to the input voltage value is input into the PFC section after stopping the power conversion operation.

A power conversion method according to the present disclosure is a power conversion method of a power converter including an input voltage detection section that detects an input voltage value of input AC power, a power factor correction (PFC) section, a current value to be input into the PFC section being variable depending on the input voltage value, and a DC-DC conversion section that is provided subsequent to the PFC section, the power converter being configured to convert the AC power into DC power, the power conversion method including:

stopping power conversion operation in a case where the input voltage value is greater than or equal to a predetermined value; and resuming the power conversion such that a second input current value lower than a first input current value corresponding to the input voltage value is input into the PFC section after stopping the power conversion operation.

Advantageous Effects of Invention

According to an embodiment of the present disclosure, insufficient charging of a rechargeable battery during charging can be suppressed, and reduction of life of an installed internal component can be suppressed.

DESCRIPTION OF EMBODIMENTS

Figure 1:
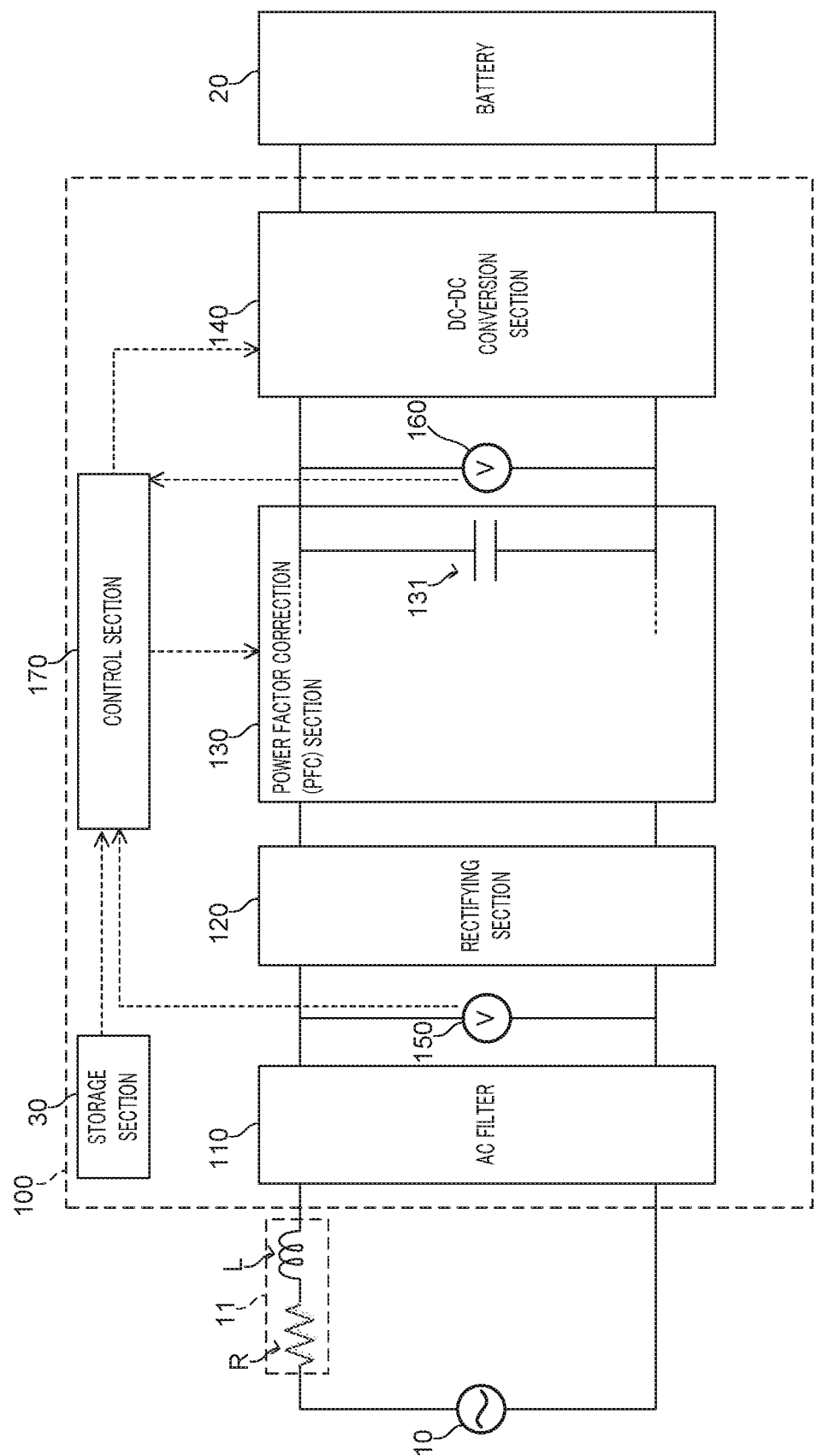
FIG. 1 illustrates a power converter according to an embodiment of the present disclosure.

Hereinafter, an embodiment of the present disclosure will be described in detail with reference to the accompanying drawings. FIG. 1 illustrates power converter 100 according to the embodiment of the present disclosure.

As illustrated in FIG. 1, power converter 100 is a charger that is connected to external AC supply 10 through harness 11, and converts AC power supplied from external AC supply 10 into DC power to charge battery 20. Battery 20 is a rechargeable battery such as an onboard battery.

Power converter 100 includes AC filter 110, rectifying section 120, power factor correction (PFC) section 130, DC-DC conversion section 140, first voltage detection section 150, second voltage detection section 160, and control section 170.

AC filter 110 eliminates noise in AC power input from external AC supply 10.

Rectifying section 120 has a diode bridge circuit configured of four diodes, for example, converts AC power output from external AC supply 10 into DC power by full-wave rectification, and outputs the DC power to PFC section 130.

PFC section 130 is a PFC circuit that corrects the power factor of DC power input from rectifying section 120. Electrolytic capacitor 131 is connected to the output side of PFC section 130. Electrolytic capacitor 131 is charged with electric charge corresponding to the output of PFC section 130 to thereby smooth the DC power output from PFC section 130.

DC-DC conversion section 140 is a circuit that converts DC power output from PFC section 130 into DC power that can charge battery 20 under control of control section 170, and is connected subsequent to PFC section 130 through electrolytic capacitor 131. DC power converted by DC-DC conversion section 140 is output to battery 20 to charge battery 20.

First voltage detection section 150 is provided between AC filter 110 and rectifying section 120, to detect an input voltage value input from external AC supply 10 and output the detected input voltage value to control section 170. First voltage detection section 150 corresponds to "input voltage detection section" of the present disclosure. Note that first voltage detection section 150 may be provided between rectifying section 120 and PFC section 130.

Second voltage detection section 160 is provided between PFC section 130 and DC-DC conversion section 140, to detect an output voltage value of PFC section 130. Second voltage detection section 160 outputs the detected output voltage value to control section 170.

Control section 170 includes a central processing unit (CPU), a read-only memory (ROM), a random-access memory (RAM), and other components. The CPU reads out a program corresponding to the processing content from the ROM, develops the program in the RAM, and co-operates with the developed program to perform centralized control over operations of blocks of power converter 100. At this time, the CPU refers to various data stored in storage section 30. Storage section 30 is configured of a nonvolatile semiconductor memory (so-called flash memory) and a hard disk drive, for example.

Control section 170 retrieves an input voltage value of external AC supply 10 detected by first voltage detection section 150 and determines an input current value to be input into PFC section 130 according to the input voltage value, to perform control for adjusting gain of output of PFC section 130.

Specifically, control section 170 performs control to retrieve an input current value set according to the retrieved input voltage value from storage section 30, and input the retrieved input current value into PFC section 130.

Here, the input voltage value to be input into power converter 100 may vary depending on fluctuation in voltage in the external AC supply 10. Variation in the input voltage value input into power converter 100 may fluctuate output of components of power converter 100, and may hinder a desired output. To deal with such fluctuation in the input voltage value, gain is adjusted for output of PFC section 130.

Accordingly, gain of PFC section 130 is adjusted appropriately even with variation in the input voltage value from external AC supply 10.

Storage section 30 stores information on correspondences between the input voltage value and the input current value as illustrated in Table 1, for example.

TABLE 1

| INPUT VOLTAGE VALUE | INPUT CURRENT VALUE |
|---|---|
| 100 V | A |
| 120 V | B |
| 140 V | C |

The order of magnitude of A, B, and C of the input current values in Table 1 is A>B>C. As illustrated in Table 1, the larger the input current value, the smaller the input voltage value. With this setting, the current value to be input into PFC section 130 is variable according to the input voltage value, and gain of PFC section 130 can be adjusted appropriately.

Control section 170 retrieves an output voltage value of PFC section 130 from second voltage detection section 160, and determines whether to stop operation of PFC section 130 depending on the output voltage value. In a case where the output voltage value of PFC section 130 is greater than or equal to a threshold, control section 170 determines to stop operation of PFC section 130, and stops operation of PFC section 130.

The threshold is a voltage value equivalent to a state where an overvoltage occurs in electrolytic capacitor 131 provided in PFC section 130, for example. Such an overvoltage occurs when an output voltage value of PFC section 130 rises to an excess value due to external perturbations, for example, or when the amount of current fluctuation increases within a short time period due to switching of a current value input into PFC section 130 in the middle of charging, as will be described later.

With this configuration, operation of PFC section 130 stops when an overvoltage occurs in electrolytic capacitor 131. Hence, overvoltage does not occur repeatedly in electrolytic capacitor 131, and therefore breakage of electrolytic capacitor 131 can be prevented.

Additionally, in a case where an input voltage value retrieved from first voltage detection section 150 is greater than or equal to a predetermined value, control section 170 performs control to stop power conversion operation in power converter 100, that is, operation of charging battery 20.

The predetermined value is a voltage value larger than the input voltage values set in the above Table 1, for example.

Stopping of power conversion operation in power converter 100 includes states where operations of PFC section 130, DC-DC conversion section 140, and other components are stopped, and states where there is no output from PFC section 130 and DC-DC conversion section 140.

Input of an excess voltage such as a lightening surge into power converter 100 may cause trouble such as breakage of internal components of power converter 100. However, in such a case, the aforementioned trouble can be prevented by performing control to stop power conversion operation in power converter 100.

After stoppage of power conversion operation in power converter 100, to prevent stoppage of charging of battery 20 from being continued, control section 170 performs control to resume power conversion operation of power converter 100.

Specifically, control section 170 performs control to resume power conversion operation, so that a second input current value lower than a first input current value initially set before stoppage is input into PFC section 130 after stoppage of power conversion operation.

There is some inductance and resistance in a connection part between external AC supply 10 and power converter 100. Examples of some inductance and resistance include wire inductance and wire resistance of harness 11 of external AC supply 10 connecting to power converter 100, and parasitic inductance and resistance of external AC supply 10. Note that in the following description, inductance L and resistance R included in harness 11 illustrated in FIG. 1 is used as an example.

When the value of resistance R on external AC supply 10 side is excessively large, the input voltage value of power converter 100 may drop more drastically than the assumed amount. In this case, after an input current value is set before the start of power conversion operation, when operation of PFC section 130 is started, the voltage value input into PFC section 130 drops excessively due to the drop of the voltage value, and the input voltage value changes to a substantially different value. As a result, the input current value may be switched to an input current value corresponding to a different input voltage value in the middle of charging.

Figure 2:
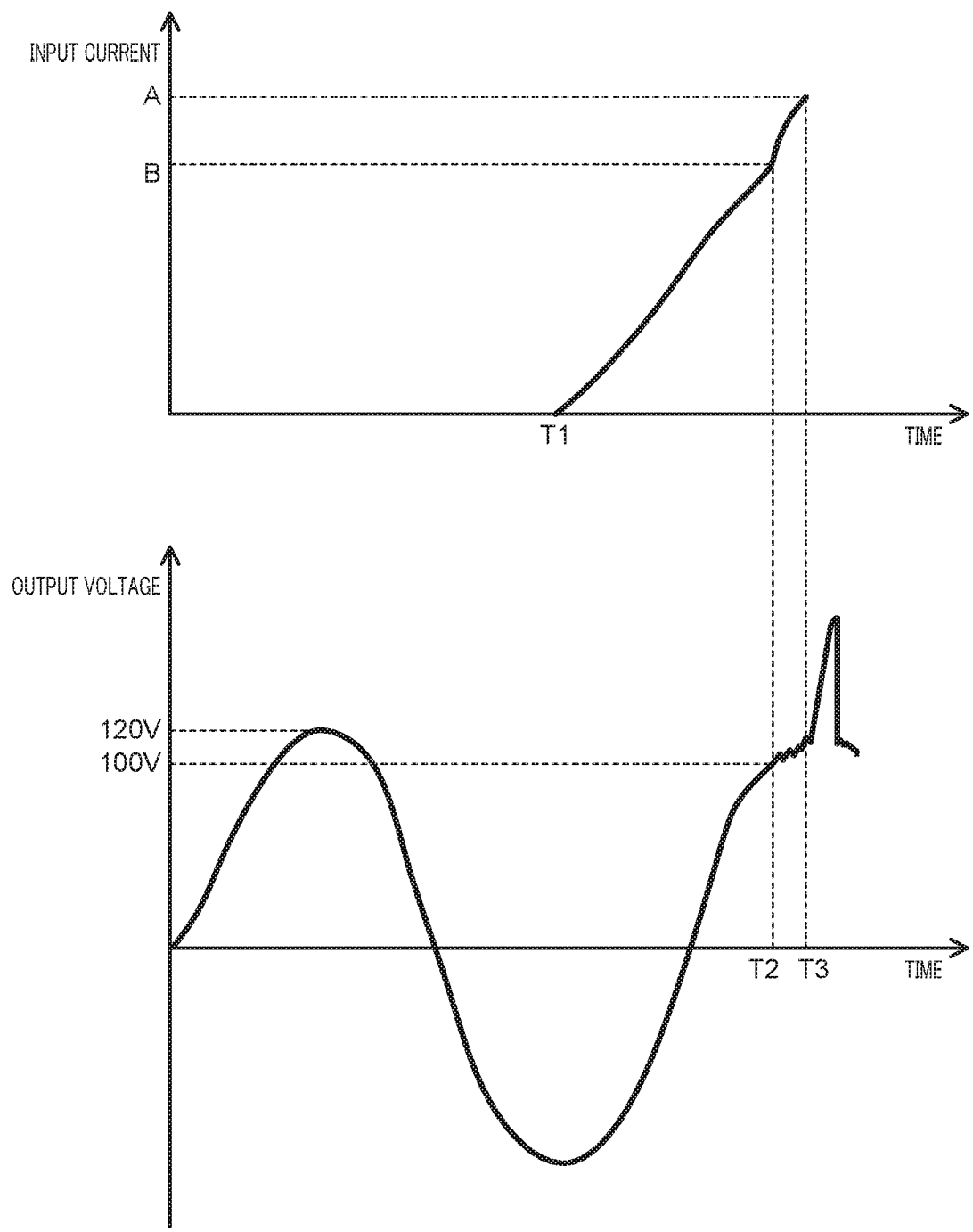
FIG. 2 illustrates changes in an input current and an output voltage of a power factor correction (PFC) section over time.

FIG. 2 illustrates changes in the output voltage and the input current of PFC section 130 over time. The upper diagram in FIG. 2 illustrates changes in the input current of PFC section 130 over time. The lower diagram in FIG. 2 illustrates changes in the output voltage of PFC section 130 over time.

As illustrated in FIG. 2, when the input voltage value (voltage value detected by first voltage detection section 150) of PFC section 130 before starting power conversion operation is 120 V, control section 170 sets the input current value of PFC section 130 to B, and the current value input into PFC section 130 gradually increases after the start of power conversion operation (time T1). Then, when the amount of voltage drop caused by resistance R is about 20 V due to a relationship between B and the value of resistance R, for example, when the input current value reaches the set value B, the voltage value detected by first voltage detection section 150 is 100 V (20 V drop from 120 V). The amount of voltage drop is calculated as the product of the input current value and resistance R.

At this time, control section 170 determines that the input voltage value is 100 V, and switches the input current value of PFC section 130 from B to A (time T2) in the middle of charging according to Table 1. Hence, the input current value of PFC section 130 rises toward A, and the current fluctuation in a short time period at this time increases the amount of electric charges charging electrolytic capacitor 131, whereby an overvoltage is applied on electrolytic capacitor 131.

Control section 170 stops operation of PFC section 130 (time T3) on the basis of the output result of second voltage detection section 160. This reduces the current value input into PFC section 130 to 0 or a minute value.

At this time, along with the stoppage of PFC section 130, a voltage surge occurs due to inductance L on external AC supply 10 side. When the value of inductance is indicated by L and the input current value is indicated by I, the voltage surge is a value obtained by $\frac{1}{2} \times L \times I^2$.

That is, when inductance L on external AC supply 10 side is excessively large, a severe voltage surge occurs in power converter 100 at the time of stopping operation of PFC section 130.

Accordingly, since the input voltage value detected by first voltage detection section 150 becomes excessively high after stopping operation of PFC section 130 at time T3, control section 170 performs control and stops power conversion operation of power converter 100. That is, although power conversion operation of power converter 100 is stopped due to inductance L and resistance R on external AC supply 10 side, when such a phenomenon occurs, a similar phenomenon may occur again even when control is performed to resume power converter 100, as long as the same external AC supply 10 is connected to power converter 100.

Specifically, in a case where the input current value of PFC section 130 is set to a current value corresponding to the input voltage value of external AC supply 10, a similar voltage drop lowers the input voltage value of PFC section 130, causes switching of the input current value, so that similar voltage surges occur even after resumption of charging. As a result, stoppage of power converter 100 and resumption of power conversion operation are repeated endlessly.

In the embodiment, the input current value after resumption is set to a second input current value lower than the first input current value set according to the input voltage value. This can reduce the amount of voltage drop (product of input current value and resistance R) caused by resistance R on external AC supply 10 side, and can therefore suppress switching of the input current value of PFC section 130 in the middle of charging.

Even when PFC section 130 stops due to the voltage drop, the energy amount of voltage surge (a value obtained by $\frac{1}{2} \times L \times I^2$) caused by inductance L on external AC supply 10 side can be reduced, and therefore stoppage of power conversion operation in power converter 100 can be suppressed.

Moreover, control section 170 counts the number of times of resumption of power conversion operation, and sets the second input current value, so that the amount of reduction from the first input current value increases according to the number of times of resumption. That is, the more frequently power conversion operation is resumed, the smaller control section 170 sets the input current value at the time of resuming power conversion operation.

As illustrated in Table 2, the input current value may be reduced constantly along with increase in the number of times of resumption.

TABLE 2

| NUMBER OF TIMES OF RESUMPTION | INPUT CURRENT VALUE |
|---|---|
| 0 | 32 A |
| 1 | 29 A |
| 2 | 26 A |
| 3 | 23 A |
| 4 | 20 A |
| 5 | 17 A |

In Table 2, the input current value set before stoppage is 32 A, and the input current value is set to be reduced by 3A every time the number of times of resumption increases.

Figure 3:
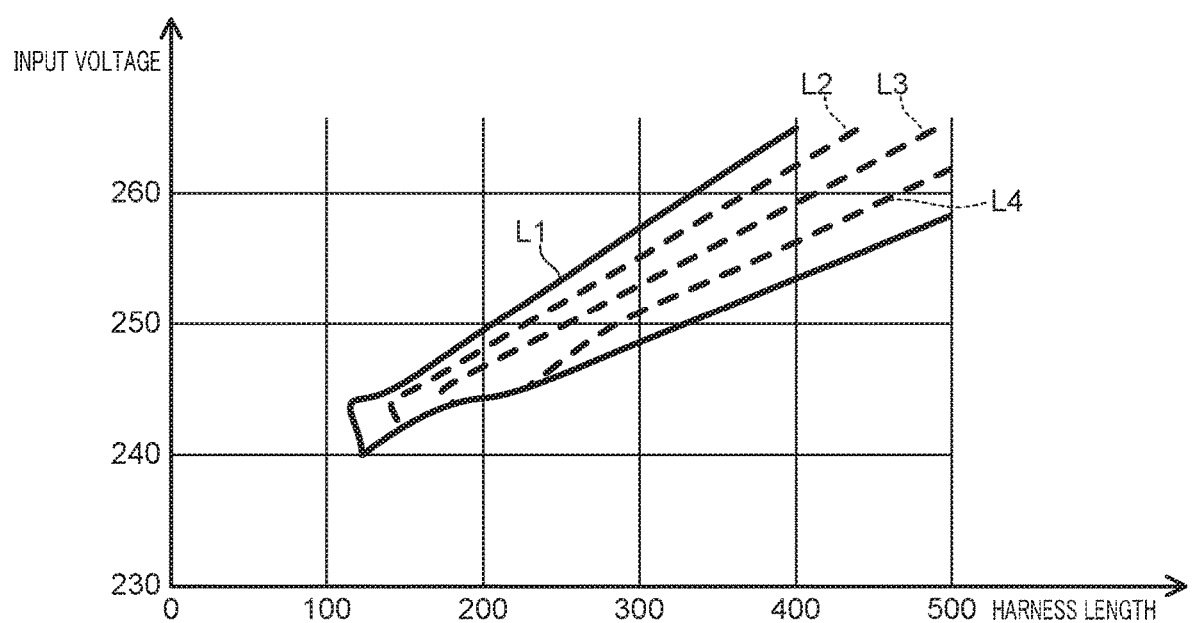
FIG. 3 illustrates a range in which a severe voltage surge occurs in a relationship between an input voltage of an external AC supply and a harness length.

FIG. 3 is an experiment result indicating the range in which a severe voltage surge occurs in a relationship between the input voltage of external AC supply 10 and a harness length. In FIG. 3, the harness length is expressed in units of m, and the input voltage of external AC supply 10 is expressed in units of V. Note that FIG. 3 illustrates an experiment result in which only harness 11 is assumed to include inductance and resistance. The wire diameter of harness 11 is 5.5 mm, and harness 11 is a straight wire.

In FIG. 3, of substantially U-shaped solid line L1 opened toward the obliquely upper right side, a range sandwiched between the upper and lower sides is the range in which a severe voltage surge occurs with an input current value of 32 A. In FIG. 3, a range sandwiched between broken line L2 and lower solid line L1 is the range in which a severe voltage surge occurs with an input current value of 29 A. In FIG. 3, a range sandwiched between broken line L3 and lower solid line L1 is the range in which a severe voltage surge occurs with an input current value of 26 A. In FIG. 3, a range sandwiched between broken line L4 and lower solid line L1 is the range in which a severe voltage surge occurs with an input current value of 23 A.

For example, as illustrated in FIG. 3, when the input current value is 32 A, a severe voltage surge occurs within the range sandwiched between upper and lower parts of solid line L1. However, it has been confirmed by experiments such as simulation that the smaller the input current value is set (see broken lines L2 to L4), the narrower the range in which a severe voltage surge occurs becomes. That is, by reducing the input current value, the range in which a severe voltage surge occurs can be reduced, and therefore stoppage of power converter 100 due to a voltage surge can be made less frequent.

After stoppage of power conversion operation, control section 170 may resume power conversion operation with the aforementioned first input current value. Then, when the input voltage value becomes greater than or equal to a predetermined value after performing resumption control with the first input current value for a predetermined number of times (such as three), control section 170 may resume power conversion operation so that the second input current value may be input into PFC section 130.

For example, even when a large voltage such as a lightening surge is input into power converter 100, such a large voltage does not occur frequently, and is not likely to occur after occurring about once or twice. For this reason, when power conversion operation of power converter 100 is to be resumed after stoppage of power conversion operation due to a phenomenon such as a lightening surge, the input current value is not lowered from the first input current value.

With this configuration, power conversion operation can be resumed without lowering the input current value when power conversion operation is stopped due to a factor other than inductance and resistance on external AC supply 10 side. Hence, the smaller the input current value, the longer the charge time becomes. By performing such control, it is possible to suppress needless extension of charge time when power conversion operation is stopped by factors other than inductance and resistance on external AC supply 10 side.

Figure 4:
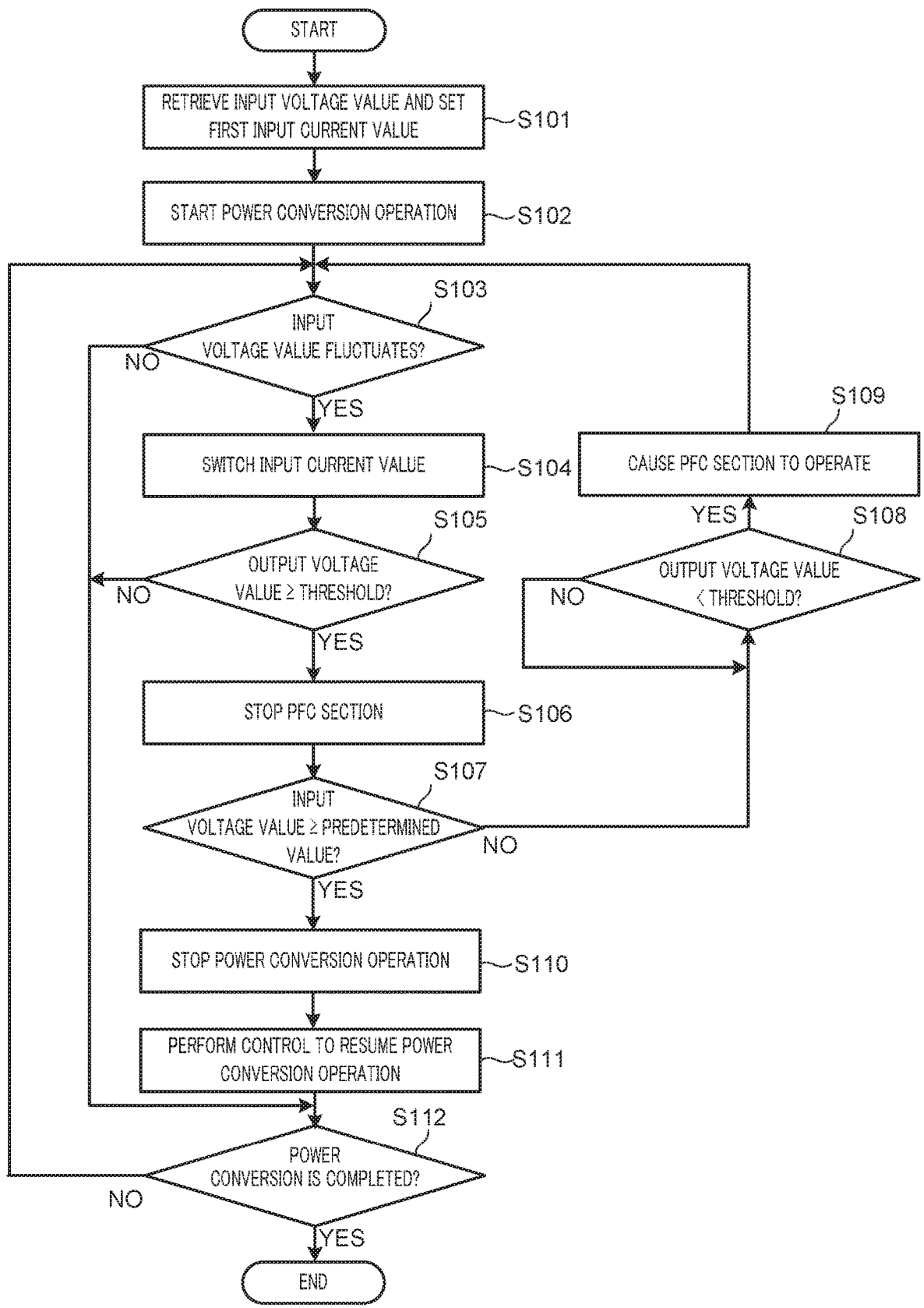
FIG. 4 is a flowchart illustrating an operation example of power conversion operation resumption control by the power converter.

An operation example of power conversion operation resumption control by power converter 100 configured in the above manner will be described. FIG. 4 is a flowchart illustrating an operation example of power conversion operation resumption control by power converter 100. Processing in FIG. 4 is performed when power converter 100 is connected to external AC supply 10, for example.

As illustrated in FIG. 4, control section 170 retrieves an input voltage value from first voltage detection section 150, and sets the input current of PFC section 130 to the first input current value according to Table 1 (step S101). Then, control section 170 starts power conversion operation (step S102). Next, control section 170 determines whether the input voltage value fluctuates (step S103).

When it is determined that the input voltage value does not fluctuate (step S103, NO), the processing proceeds to step S112. Meanwhile, when the input voltage value fluctuates (step S103, YES), control section 170 switches the input current value of PFC section 130 (step S104).

Next, control section 170 determines whether the output voltage value is greater than or equal to the threshold (step S105). Note that the processing of step S105 is performed constantly in power conversion operation of power converter 100, regardless of whether it is determined YES in step S103.

When it is determined that the output voltage value is smaller than the threshold (step S105, NO), the processing proceeds to step S112. Meanwhile, in a case where the output voltage value is greater than or equal to the threshold (step S105, YES), control section 170 stops PFC section 130 (step S106).

Next, control section 170 determines whether the input voltage value is greater than or equal to a predetermined value (step S107). Note that the processing of step S107 is performed constantly in power conversion operation of power converter 100, regardless of whether it is determined YES in steps S103 and S105.

When it is determined that the input voltage value is smaller than the predetermined value (step S107, NO), control section 170 determines whether the output voltage value of PFC section 130 is smaller than the threshold (step S108).

When it is determined that the output voltage value of PFC section 130 is greater than or equal to the threshold (step S108, NO), the processing of step S108 is repeated. Meanwhile, in a case where the output voltage value of PFC section 130 is smaller than the threshold (step S108, YES), control section 170 causes PFC section 130 to operate (step S109), and the processing returns to step S103.

Returning to the determination of step S107, in a case where the input voltage value is greater than or equal to the predetermined value (step S107, YES), control section 170 stops power conversion operation (step S110). Next, control section 170 performs control to resume power conversion operation (step S111). Next, control section 170 determines whether power conversion operation of power converter 100 is completed (step S112).

When it is determined that power conversion operation is not completed (step S112, NO), the processing returns to step S103. Meanwhile, when power conversion operation is completed (step S112, YES), the control is completed.

Figure 5:
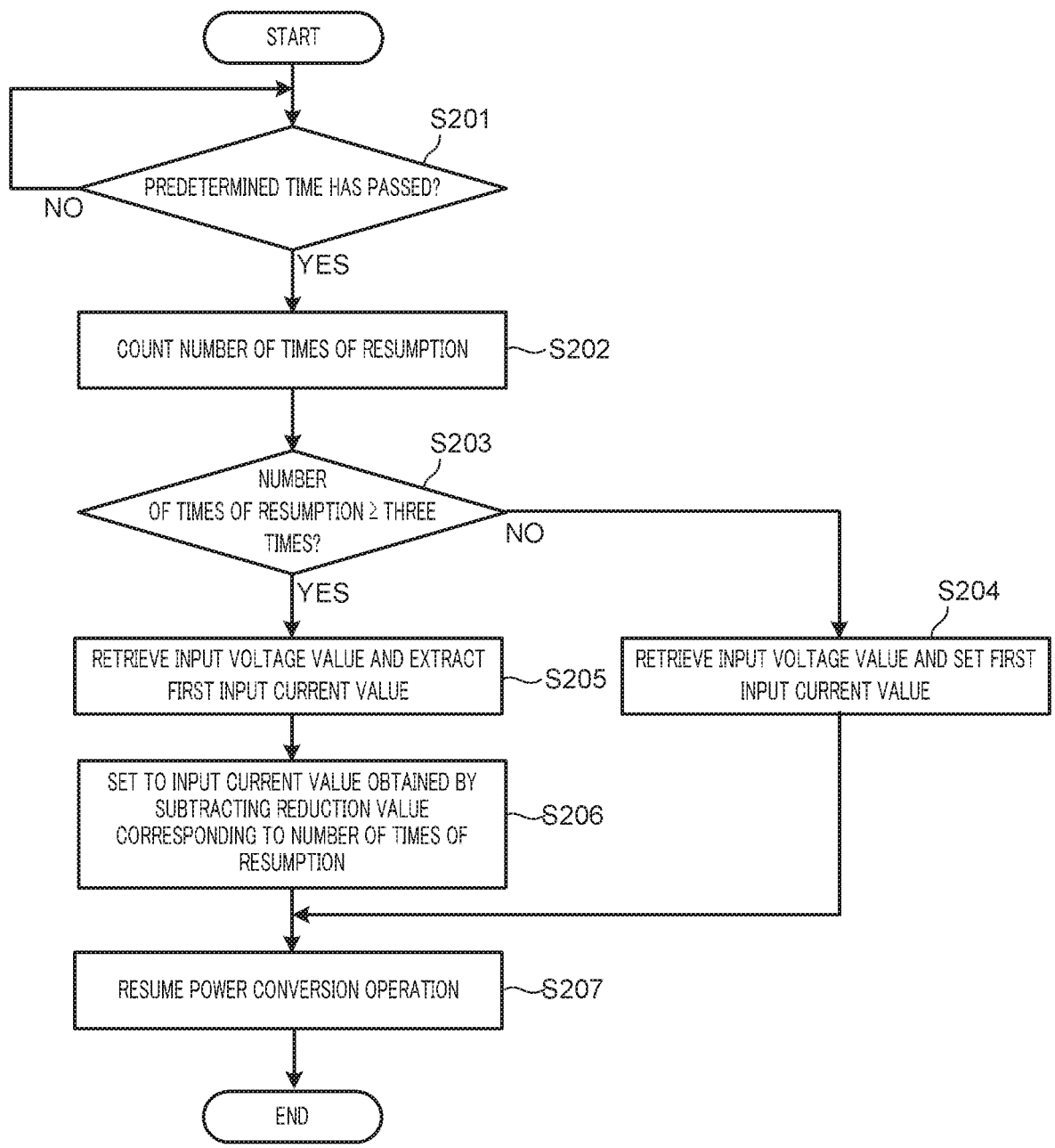
FIG. 5 is a flowchart illustrating an example of a detailed operation of power conversion operation resumption control by the power converter.

Next, an example of a detailed operation of power conversion resumption control by power converter 100 will be described. FIG. 5 is a flowchart illustrating an example of a detailed operation of power conversion operation resumption control by power converter 100. Processing of FIG. 5 is performed when processing of step S111 of FIG. 4 is performed.

As illustrated in FIG. 5, control section 170 determines whether a predetermined time has passed after stopping power conversion operation in the processing of step S110 in FIG. 4 (step S201). When it is determined that the predetermined time has not passed (step S201, NO), the processing of step S201 is repeated.

Meanwhile, in a case where the predetermined time has passed (step S201, YES), control section 170 counts the number of times of resumption of power conversion operation (step S202). Next, control section 170 determines whether the number of times of resumption of power conversion operation is three times or more (step S203).

When it is determined that the number of times of resumption is less than three times (step S203, NO), control section 170 retrieves an input voltage value and sets the input current value to the first input current value according to Table 1 (step S204). With this processing, power conversion operation (charging of battery 20) can be completed promptly without reducing the input current value when power conversion operation is stopped by a brief surge such as a lightening surge.

Meanwhile, when the number of times of resumption is three times or more (step S203 YES), control section 170 retrieves an input voltage value, and extracts a first input current value corresponding to the input voltage value according to Table 1 (step S205).

Next, control section 170 reads out a reduction value corresponding to the number of times of resumption. Table 3 is information on correspondences between the number of times of resumption of power conversion operation and the reduction value corresponding to the number of times of resumption stored in storage section 30, for example.

TABLE 3

| NUMBER OF TIMES OF RESUMPTION | REDUCTION VALUE |
|---|---|
| 0~2 | 0 A |
| 3 | −3 A |
| 4 | −6 A |
| 5 | −9 A |
| 6 | −12 A |
| 7 | −15 A |

Then, control section 170 sets a value obtained by subtracting the read-out reduction value from the first input current value as the input current value (step S206). After steps S204 and S206, control section 170 resumes power conversion operation (step S207).

Thereafter, the control is completed.

According to the embodiment configured in the above manner, when control section 170 performs control to resume power conversion operation, the input current of PFC section 130 is set to a second input current value smaller than the initially set first input current value. This can reduce the amount of voltage drop caused by resistance R on external AC supply 10 side, and therefore can suppress switching of the input current value of PFC section 130.

Even when the amount of voltage drop is large enough to switch the input current value of PFC section 130, the amount of voltage surge caused by inductance L on external AC supply 10 side can be suppressed, and therefore stoppage of power conversion operation by power converter 100 can be prevented. As a result, insufficient charging of battery 20 can be prevented, and also reduction of life of internal components such as electrolytic capacitor 131 installed in power converter 100 due to repeated charging and discharging by the internal component can be suppressed.

In the above embodiment, the number of times of resumption is used to determine whether stoppage of power converter 100 is attributable to inductance and resistance on external AC supply 10 side or to other factors. However, the present disclosure is not limited to this.

For example, control section 170 may perform control to resume power conversion operation with the first input current value in a case where the input voltage value is greater than or equal to a second predetermined value larger than the aforementioned predetermined value, and resume power conversion operation with the second input current value in a case where the input voltage value is greater than or equal to the predetermined value and does not exceed the second predetermined value.

The second predetermined value is a voltage value larger than a voltage value that is a criteria for stopping power conversion operation, for example, due to occurrence of a voltage surge caused by inductance and resistance on external AC supply 10 side.

This makes it easier to identify whether stoppage of power converter 100 is attributable to inductance and resistance on external AC supply 10 side or to other factors.

Moreover, control section 170 may be configured to store, in storage section 30, a second input current value that enabled power conversion operation without stopping power conversion operation when a predetermined external AC supply 10 was connected in the past. In this case, control section 170 may perform power conversion operation with the second input current value stored in storage section 30 when the predetermined external AC supply 10 is connected to power converter 100.

With this configuration, it is possible to suppress repeating power resumption control of power conversion operation when the same external AC supply 10 is used for power conversion operation.

In the above embodiment, the input current value is reduced along with increase in the number of times of resumption after stoppage of power conversion operation. However, the present disclosure is not limited to this. For example, when power conversion operation is not stopped after the input current value is lowered once, the input current value may be raised to a value smaller than the initially set first input current value.

For example, when power conversion operation is stopped in a case where the initially set current value is 32 A, the input current value is lowered to 20 A. Thereafter, when power conversion operation is not stopped again after resuming power conversion operation, the input current value is raised to 26 A. Then when power conversion operation is not stopped after resuming power conversion operation in this manner, the input current value is raised to 29 A. In this case, when power conversion operation is not stopped after resuming power conversion operation, the input current value is set to 29 A, and when power conversion operation is stopped, the input current value is set to 26 A.

Thus, the input current value can be gradually brought closer to an optimal value.

The above embodiments are mere examples of implementation of the present disclosure, and are not intended to limit the technical scope of the present disclosure. The present disclosure can be carried out in various forms without departing from the gist and principal characteristics of the present disclosure.

While various embodiments have been described herein above, it is to be appreciated that various changes in form and detail may be made without departing from the spirit and scope of the invention(s) presently or hereafter claimed.

This application is entitled to and claims the benefit of Japanese Patent Application No. 2018-010541, filed on Jan. 25, 2018, the disclosure of which including the specification, drawings and abstract is incorporated herein by reference in its entirety.

INDUSTRIAL APPLICABILITY

The power converter of the present disclosure is useful as a power converter that can suppress insufficient charging of a rechargeable battery during charging, and can also suppress reduction of life of an installed internal component.

The invention claimed is:

1. A power converter that converts input AC power into DC power, the power converter comprising:
an input voltage detection section that detects an input voltage value of the AC power;
a power factor correction (PFC) section, a current value to be input into the PFC section being variable depending on the input voltage value;
a DC-DC conversion section that is provided subsequent to the PFC section; and
a control section that stops power conversion operation in a case where the input voltage value is greater than or equal to a predetermined value, wherein:
the control section resumes the power conversion operation such that a second input current value lower than a first input current value corresponding to the input voltage value is input into the PFC section after stopping the power conversion operation,
the control section resumes the power conversion operation by the first input current value in a case where the input voltage value is greater than or equal to a second predetermined value larger than the predetermined value, and
the control section resumes the power conversion operation by the second input current value in a case where the input voltage value is greater than or equal to the predetermined value and is smaller than the second predetermined value.

2. The power converter according to claim 1, wherein the control section stops operation of the PFC section in a case where an output voltage value of the PFC section is greater than or equal to a threshold.

3. The power converter according to claim 1, wherein:
the control section resumes the power conversion operation by the first input current value after stopping the power conversion operation, and
the control section, after resuming the power conversion operation by the first input current value, resumes the power conversion operation such that the second input current value is input into the PFC section in a case where the input voltage value is greater than or equal to the predetermined value.

4. The power converter according to claim 1, wherein the second predetermined value is a voltage value larger than a voltage value that is a criteria for stopping the power conversion operation.

5. The power converter according to claim 1, wherein the control section sets the second input current value such that the second input current value at a time of resuming the power conversion operation is negatively correlated with a number of times the power conversion operation is resumed.

6. The power converter according to claim 4, wherein:
the control section counts a number of times the power conversion operation is resumed, and
the control section sets the second input current value such that an amount of reduction from the first input current value increases according to the number of times the power conversion operation is resumed.

7. The power converter according to claim 1, further comprising a storage section that stores the second input current value that enabled the power conversion operation without stopping the power conversion operation when a predetermined AC power supply has been connected previously, wherein
the control section performs the power conversion operation by the second input current value stored in the storage section, when the predetermined AC power supply is connected.

8. The power converter according to claim 1, wherein:
the control section stops operation of the PFC section in a case where an output voltage value of the PFC section is greater than or equal to a threshold,
the PFC section includes an electrolytic capacitor to be connected to an output side of the PFC section, and
the threshold is a voltage value equivalent to a state where an overvoltage occurs in the electrolytic capacitor.

9. The power converter according to claim 8, wherein the overvoltage is a voltage that breaks the electrolytic capacitor in a case where the voltage occurs continuously in the electrolytic capacitor.

10. The power converter according to claim 1, wherein the predetermined value is a value equivalent to a voltage value larger than a maximum value of the input voltage value.

11. The power converter according to claim 1, further comprising an output voltage detection section that detects an output voltage value of the PFC section.

12. The power converter according to claim 1, wherein in a case where the power conversion operation is not stopped again after lowering an input current value and then resuming the power conversion operation, the control section raises the input current value to a value smaller than the first input current value.

13. A power conversion method of a power converter including an input voltage detection section that detects an input voltage value of input AC power, a power factor correction (PFC) section, a current value to be input into the PFC section being variable depending on the input voltage value, and a DC-DC conversion section that is provided subsequent to the PFC section, the power converter being configured to convert the AC power into DC power, the power conversion method comprising:

stopping power conversion operation in a case where the input voltage value is greater than or equal to a predetermined value; and resuming the power conversion operation such that a second input current value lower than a first input current value corresponding to the input voltage value is input into the PFC section after stopping the power conversion operation, wherein:

the power conversion operation is resumed by the first input current value in a case where the input voltage value is greater than or equal to a second predetermined value larger than the predetermined value, and the power conversion operation is resumed by the second input current value in a case where the input voltage value is greater than or equal to the predetermined value and is smaller than the second predetermined value.

14. A power converter that converts input AC power into DC power, the power converter comprising:

an input voltage detection section that detects an input voltage value of the AC power;

a power factor correction (PFC) section, a current value to be input into the PFC section being variable depending on the input voltage value;

a DC-DC conversion section that is provided subsequent to the PFC section;

a control section that stops power conversion operation in a case where the input voltage value is greater than or equal to a predetermined value; and a storage section that stores a first input current value that enabled the power conversion operation without stopping the power conversion operation when a predetermined AC power supply has been connected previously, wherein:

the control section resumes the power conversion operation such that the first input current value lower than a second input current value corresponding to the input voltage value is input into the PFC section after stopping the power conversion operation, and the control section performs the power conversion operation by the first input current value stored in the storage section, when the predetermined AC power supply is connected.

* * * * *